US012571717B2

(12) United States Patent
Berezhnyy

(10) Patent No.: US 12,571,717 B2
(45) Date of Patent: Mar. 10, 2026

(54) ADJUSTABLE APERTURE FOR FLOW CYTOMETER

(71) Applicant: Beckman Coulter, Inc., Brea, CA (US)

(72) Inventor: Ihor Berezhnyy, San Jose, CA (US)

(73) Assignee: Beckman Coulter, Inc., Brea, CA (US)

( * ) Notice: Subject to any disclaimer, the term of this patent is extended or adjusted under 35 U.S.C. 154(b) by 203 days.

(21) Appl. No.: 18/449,433

(22) Filed: Aug. 14, 2023

(65) Prior Publication Data

US 2024/0068926 A1 Feb. 29, 2024

Related U.S. Application Data

(60) Provisional application No. 63/373,487, filed on Aug. 25, 2022.

(51) Int. Cl.
| | |
|---|---|
| *G01N 15/1434* | (2024.01) |
| *G01N 15/00* | (2024.01) |
| *G01N 15/02* | (2024.01) |
| *G01N 15/0205* | (2024.01) |
| *G01N 15/10* | (2024.01) |
| *G01N 15/14* | (2024.01) |

(52) U.S. Cl.
CPC ..... *G01N 15/1434* (2013.01); *G01N 15/0211* (2013.01); *G01N 2015/0038* (2013.01); *G01N 2015/0294* (2013.01); *G01N 2015/1006* (2013.01); *G01N 2015/1493* (2013.01); *G01N 2015/1497* (2013.01)

(58) Field of Classification Search
CPC ........... G01N 15/1434; G01N 15/0211; G01N 2015/0038; G01N 2015/0294; G01N 2015/1006; G01N 2015/1493; G01N 2015/1497
See application file for complete search history.

(56) References Cited

U.S. PATENT DOCUMENTS

| | | | |
|---|---|---|---|
| 4,833,314 A | 5/1989 | Pepper et al. | |
| 5,684,587 A | 11/1997 | Naqwi | |
| 8,599,378 B2 | 12/2013 | Merchez et al. | |
| 9,390,070 B2 | 7/2016 | Bachalo et al. | |
| 2002/0108859 A1* | 8/2002 | Wang ................. G01N 15/1433 204/601 |
| 2010/0165325 A1* | 7/2010 | Tabata ............... G01N 15/1434 356/338 |

FOREIGN PATENT DOCUMENTS

CN        111398108 A        7/2020

OTHER PUBLICATIONS

CN 112991892 A and its English translation (Year: 2021).*

(Continued)

*Primary Examiner* — Chih-Cheng Kao
(74) *Attorney, Agent, or Firm* — Merchant & Gould P.C.

(57) ABSTRACT

An aperture device for a flow cytometer is described. The aperture device includes a first aperture, and a second aperture spaced apart from the first aperture by a distance. The distance between the first and second apertures and a size of the first and second apertures are adjustable to create an optimal light intensity fringe pattern for analyzing a particle having a preselected type or characteristic at an interrogation zone of the flow cytometer.

16 Claims, 13 Drawing Sheets

(56) References Cited

OTHER PUBLICATIONS

Krist, J., "Proper: An Optical Propagation Library", obtained online: https://proper-library.sourceforge.net/, Aug. 11, 2022, 3 pages.
Mullikin, J., et al., "Fringe-Scan Flow Cytometry", Alan R. Liss, Inc., Cytometry, 9, pp. 111-120, Mar. 1988, https://doi.org/10.1002/cyto.990090203, 10 pages.
Paschotta, R., "Common-path Interferometers", obtained online: https://www.rp-photonics.com/common_path_interferometers.html, Aug. 11, 2022, 4 pages.
Shintake, T., "Proposal of Absolute Nanometer Size Measurement in Flow Cytometry Based on Laser Interferometry", arXiv: 2105.11542, May 2021, https://doi.org/10.48550/arxiv.2105.11542, 21 pages.

* cited by examiner

170

162a, 162b

172

164a, 164b

174

166a, 166b

1100

1102

Receive Selection of Particle Type

1104

Adjust First and Second Apertures

1106

Generate Light Intensity Fringe Pattern

1108

Collect Data

1106

1202

Emit Excitation Light Beam(s)

1204

Generate Collimated Beam

1206

Transmit Through Aperture Device

1208

Create Light Intensity Fringe Pattern

ADJUSTABLE APERTURE FOR FLOW CYTOMETER

CROSS-REFERENCE TO RELATED APPLICATIONS

This application claims priority to U.S. Provisional Patent Application 63/373,487 filed Aug. 25, 2022, the disclosure of which is incorporated herein by reference in its entirety.

BACKGROUND

In flow cytometry, particles are arranged in a sample stream, and typically pass one-by-one through one or more excitation light beams with which the particles interact. Light scattered or emitted by the particles upon interaction with the one or more excitation beams is collected and analyzed to characterize and differentiate the particles. In a sorting flow cytometer, particles may be extracted out of the sample stream after having been characterized by their interaction with the one or more excitation beams, and thereby sorted into different groups.

Conventional flow cytometers are often suitable for detecting particles having a size greater than 1000 nm. However, conventional flow cytometers are often unable to detect or discern optical signals from very small particles, such as particles on the nanoscopic scale, which can cause inaccurate detection results. Also, conventional flow cytometers are typically not well-suited for detecting spatial features such as shape and morphology of particles.

SUMMARY

The present disclosure relates to adjustable apertures for a sample processing instrument such as a flow cytometry analyzer and/or sorter. The adjustable apertures can be used to create variety of different light intensity fringe patterns at an interrogation zone for particle feature extraction and particle size detection. Various aspects are described in this disclosure, which include, but are not limited to, the following aspects.

One aspect relates to a detection system for analyzing particles, detection system comprising: a light emitting unit generating an excitation light beam; an aperture device positioned in an optical path of the excitation light beam, the aperture device including: a first aperture; and a second aperture spaced apart from the first aperture by a distance, the first and second apertures each having an adjustable size allowing the excitation light beam to pass through the aperture device as separate beams of coherent light, while a remaining portion of the excitation light beam is blocked by the aperture device; a focal lens focusing the separate beams of coherent light to overlap at a focal plane of the focal lens creating a light intensity fringe pattern at an interrogation zone; a flow chamber for streaming particles through the interrogation zone; a light collection unit receiving scattered and emitted light from the particles passing through the light intensity fringe pattern at the interrogation zone; and a computing system configured to analyze the scattered and emitted light from the particles passing through the light intensity fringe pattern to determine one or more characteristics of the particles.

Another aspect relates to an aperture device for a flow cytometer, the aperture device comprising: a first aperture; and a second aperture spaced apart from the first aperture by a distance; and the distance between the first and second apertures and a size of the first and second apertures are adjustable to create an optimal light intensity fringe pattern for analyzing a particle having a preselected type or characteristic at an interrogation zone of the flow cytometer.

Another aspect relates to a method of analyzing particles in a flow cytometer, the method comprising: receiving a selection of a particle type; adjusting at least one of a size of first and second apertures and a distance between the first and second apertures based on the particle type; generating a light intensity fringe pattern at an interrogation zone of the flow cytometer by directing an excitation light beam through the first and second apertures, and using a focal lens to converge separate beams of coherent light that emerge from the first and second apertures to overlap creating the light intensity fringe pattern at the interrogation zone; and collecting scattered or emitted light from particles of the selected particle type passing through the light intensity fringe pattern.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
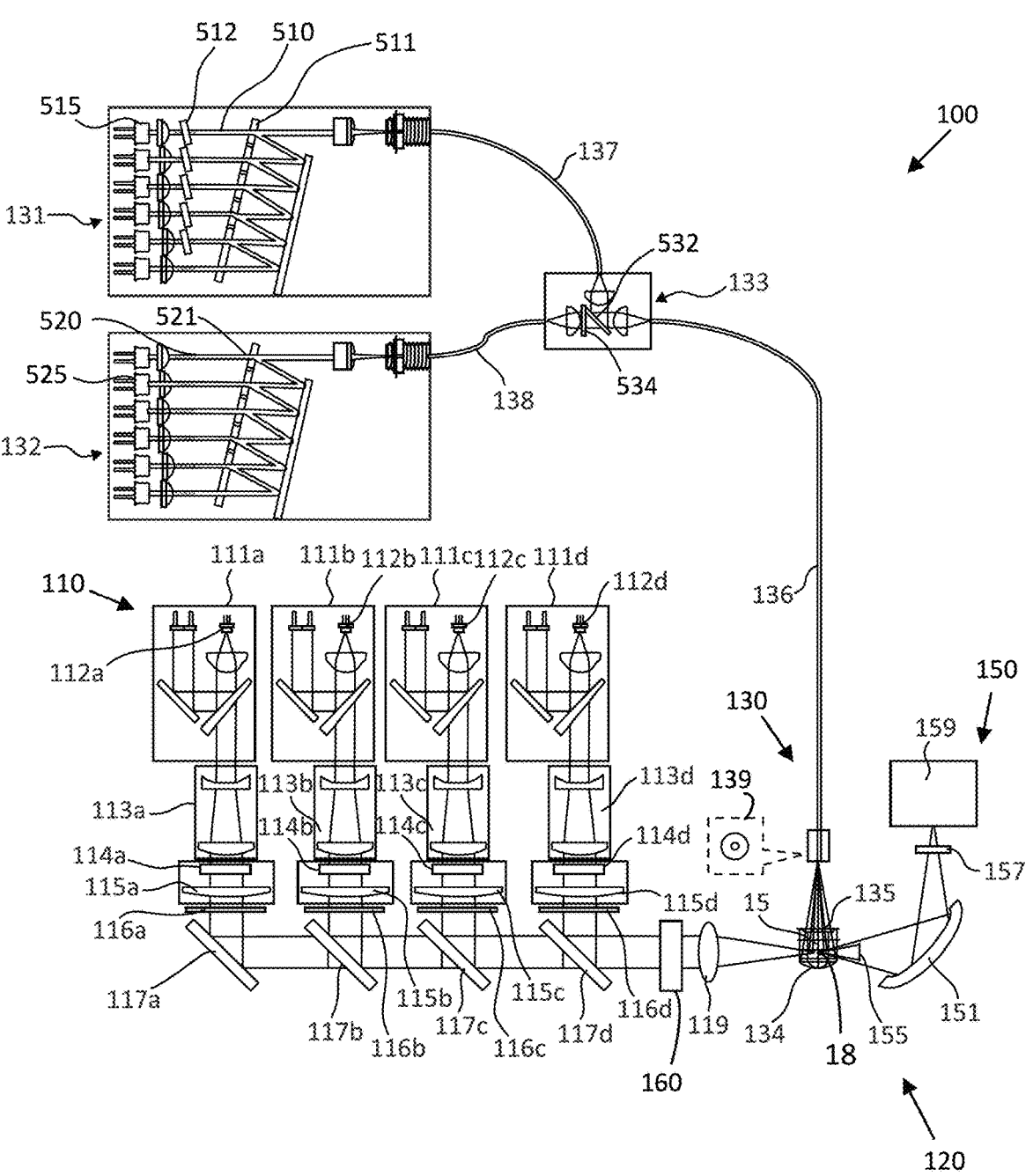
FIG. 1 schematically illustrates an example of a detection system for detecting and analyzing particles.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

An example detection system is described herein for use in a flow cytometry analyzer. It should be understood that the present disclosure is not limited to the illustrated detection system, but may be applied to a flow cytometry analyzer with other structure or other types of detection systems. In particular, the present disclosure can be applied to various types of sample processing instruments for detecting, sorting, or otherwise processing particles.

FIG. 1 schematically illustrates an example of a detection system 100 for detecting and analyzing particles including particles on the nanoscopic scale. In some examples, the detection system 100 can be incorporated into a flow cytometer and/or a sorting flow cytometer. As shown in FIG. 1, the detection system 100 includes a light emitting unit 110, and a light collection unit 120 that detects and/or analyzes particles that flow through a flow chamber 15.

The light emitting unit 110 emits an excitation light beam for projection onto particles flowing through an interrogation zone 18 in the flow chamber 15. The light collection unit 120 collects light scattered or emitted from the particles that flow through the interrogation zone 18 in the flow chamber 15 for analysis by a computing system 1300 (see FIG. 13).

The light emitting unit 110 includes multiple light sources, such as the light sources 111*a*, 111*b*, 111*c*, and 111*d* shown in FIG. 1. As an illustrative examples, the light sources 111*a*-111*d* can include lasers. The light sources 111*a*-111*d* are each configured to emit excitation light beams with different wavelengths, for example, 405 nm, 488 nm, 561 nm, and 638 nm. In the example shown in FIG. 1, the light sources 111*a*-111*d* are arranged in parallel. It should be understood that the number, the type, and the arrangement of the light sources are not limited to the example shown and described herein, and may be changed as needed. For example, the system may include three, five, six, or any other suitable number of light sources.

The light emitting unit 110 further includes a focal lens 119. The focal lens 119 is configured to focus the excitation light beams for high scatter intensity detection of particles. For example, the excitation light beams emitted by the light sources 111*a*-111*d* pass through the focal lens 119, which focuses the excitation light beams to the interrogation zone 18 of the flow chamber 15. The interrogation zone 18 may also be referred to as a focus point where the focused excitation light beams meet the core sample stream in the detection system 100.

Dichroic mirrors 117*a*, 117*b*, 117*c*, and 117*d* are arranged between the focal lens 119 and the respective light sources 111*a*-111*d*. Each of the dichroic mirrors 117*a*-117*d* is configured to reflect a light beam of a corresponding one of the light sources 111*a*-111*d* and transmit the light beams of the other light sources. The dichroic mirrors 117*a*-117*d* are selected and configured according to the wavelengths of the light beams emitted by the respective light sources 111*a*-

111*d*. For example, the dichroic mirror 117*a* reflects light of the wavelength emitted by the light source 111*a* toward the focal lens 119, the dichroic mirror 117*b* reflects light of the wavelength emitted by the light source 111*b* toward the focal lens 119 and transmits light of the wavelength emitted by the light source 111*a*, the dichroic mirror 117*c* reflects light of the wavelength emitted by the light source 111*c* toward the focal lens 119 and transmits light of the wavelengths emitted by the light sources 111*a* and 111*b*, and the dichroic mirror 117*d* reflects light of the wavelength emitted by the light source 111*d* toward the focal lens 119 and transmits light of the wavelengths emitted by the light sources 111*a*, 111*b*, and 111*c*.

The light beams emitted by the light sources 111*a*-111*d* are reflected by or transmitted through the dichroic mirrors 117*a*-117*d* to form collinear beams. The collinear beams share an optical axis, and provide a confocal point of multiple light sources by focusing on the same interrogation point. The dichroic mirrors 117*a*-117*d* are adjustable in their positions or orientations, such that they can be used to adjust the position of the focus point of the light beams, especially, the position on a plane perpendicular to the optical axis.

Lenses 115*a*-115*d* are arranged between the respective light sources 111*a*-111*d* and the respective dichroic mirrors 117*a*-117*d*. In some examples, the lenses 115*a*-115*d* are long-focus lens. In some examples, the lenses 115*a*-115*d* are spherical lenses. In other examples, the lenses 115*a*-115*d* are aspheric lenses. Each of the lenses 115*a*-115*d* can convert light beams into parallel beams. In the example shown in FIG. 1, each of the lenses 115*a*-115*d* is in the form of planoconvex lens with a flat surface and a convex surface opposite to each other.

The lenses 115*a*-115*d* are adjustable in their positions or orientations, so as to adjust the position of the focus point of the light beams, especially, the position on the plane perpendicular to the optical axis. The dichroic mirrors 117*a*-117*d* can be used to adjust the position of the focus point of the light beams, whereas the lenses 115*a*-115*d* can be used to finely adjust the position of the focus point of the light beams.

It should be understood that the number, the type, and the arrangement of the dichroic mirrors 117*a*-117*d* and the lenses 115*a*-115*d* may be changed as needed, and are not limited to the example illustrated herein. Also, the dichroic mirrors 117*a*-117*d* and the lenses 115*a*-115*d* can be replaced with other optical elements or optical modules with similar functions.

Beam expanders 113*a*-113*d* are arranged between the respective light sources 111*a*-111*d* and the respective lenses 115*a*-115*d*. Each of the beam expanders 113*a*-113*d* can change a sectional dimension and a divergence angle of a light beam. As such, each of the beam expanders 113*a*-113*d* are configurable according to a desired size of a spot of a light beam.

The light beams irradiated on the particles by the focal lens 119 have a spot size that allows for more concentrated light beams with a higher power density. This can increase intensity of the light beams irradiated on the particles, and the intensity of the optical signals collected from the particles. This can improve the efficiency of collecting the optical signals, and thereby provide higher resolution and higher sensitivity for nanoparticle detection.

In the example shown in FIG. 1, the light sources 111*a*-111*d* are in the form of lasers that include respective laser diodes 112*a*-112*d*. As further shown in the example of FIG. 1, half-wave plates 116*a*-116*d* are provided between the dichroic mirrors 117*a*-117*d* and the lenses 115*a*-115*d*, respectively. The spot of the light beam can be reduced by orientation of the light sources 111*a*-111*d* and by use of the half-wave plates 116*a*-116*d*.

As further shown in FIG. 1, cylindrical lenses 114*a*-114*d* are provided between the respective beam expanders 113*a*-113*d* and the respective lenses 115*a*-115*d*. The horizontal size of the spot of the light beam focused in the flow chamber 15 can be adjusted by replacing the cylindrical lenses 114*a*-114*d* with replacement cylindrical lenses having different curvatures. The power of some or all of the light sources 111*a*-111*d* can also be increased. The increased power of the light sources 111*a*-111*d* can also improve detection sensitivity.

Each of the beam expanders 113*a*-113*d* is formed of a first optical part and a second optical part. In the example shown in FIG. 1, each of the beam expanders 113*a*-113*d* includes a concave lens adjacent to the corresponding light source as the first optical part, and further includes a convex lens away from the corresponding light source as the second optical part. It should be understood that each of the beam expanders 113*a*-113*d* is not limited to the example shown in FIG. 1. The beam expanders 113*a*-113*d* may be formed of any suitable optical lens or lens group. For example, each of the first optical part and the second optical part can be selected from one of a convex lens, a convex lens group, a concave lens, and a concave lens group.

For each of the beam expanders 113*a*-113*d*, the distance between the first optical part (e.g., the concave lens) and the second optical part (e.g., the convex lens) is adjustable. This allows for adjustment of a waist position (the focus point) of the light beam on the optical axis.

As described above, by adjusting the dichroic mirrors 117*a*-117*d*, the lenses 115*a*-115*d*, and the beam expanders 113*a*-113*d*, the individual light beams can be focused at the desired interrogation point, and multiple light beams can be focused at the same interrogation point. It should be understood that the position of the focus point of the light beams may be adjusted by adopting any other optical element or in any other adjustment manner. One or more adjustments to the dichroic mirrors 117*a*-117*d*, the lenses 115*a*-115*d*, and the beam expanders 113*a*-113*d* may be made manually, or may be made electronically using a computing device (e.g., a controller) that is associated with one or more actuators coupled to these components.

The light collection unit 120 includes a side collection unit 130 and a forward collection unit 150. The side collection unit 130 collects side scattered light and fluorescent light scattered or emitted from the particles in the sample as they are irradiated by the excitation light beams while passing through the flow chamber 15. The optical axis of light beams collected from the particles by the side collection unit 130 is approximately perpendicular to, or about 90 degrees, from the optical axis of the light beams emitted from the light sources 111*a*-111*d* and directed by the dichroic mirrors 117*a*-117*d* toward the flow chamber 15.

The forward collection unit 150 collects forward scattered light from the particles. The optical axis of light beams collected from the particles by the forward collection unit 150 may be approximately parallel to, or about 0 degrees from, the optical axis of the light beams that are directed toward the flow chamber 15. The side collection unit 130 and the forward collection unit 150 are described in further detail below.

The side collection unit 130 includes an optical focusing lens group including a concave mirror 134 and an aspheric lens 135, a collection fiber 136, a beam splitter 133, a first wavelength division multiplexer 131, and a second wavelength division multiplexer 132. The concave mirror 134 reflects the scattered light and the fluorescent light that diverge in various directions at the interrogation point. The concave mirror 134 and the aspheric lens 135 focus the reflected light onto the collection fiber 136, for example, by focusing on the same point of the collection fiber 136 as shown in the dotted block 139 in FIG. 1. The concave mirror 134 can focus the reflected light on the fiber, while the aspheric lens 135 can make the focal point smaller (i.e., reduce the aberration). To prevent crosstalk, a beam splitter 133 is arranged to separate the scattered light with high intensity from the fluorescent light with low intensity. The separated scattered light and fluorescent light respectively enter the first wavelength division multiplexer 131 and the second wavelength division multiplexer 132 through first and second fibers 137, 138, respectively. Optical signals with different wavelengths are separated in the first wavelength division multiplexer 131 and the second wavelength division multiplexer 132 for analysis. It should be noted that the optical focusing lens group may adopt other optical elements.

The beam splitter 133 includes a dichroic mirror 532 and a notch filter 534. Collected light is directed into the beam splitter toward the dichroic mirror 532 by the collection fiber 136, which may be oriented such that the light beam is directed toward the dichroic mirror 532 at an incident angle of, for example, 45 degrees. The dichroic mirror 532 reflects the side scattered light coming out of the collection fiber 136 such that the side scattered light enters the first wavelength division multiplexer 131 through the first fiber 137.

The fluorescent light coming out of the collection fiber 136 passes through dichroic mirror 532, and is incident to the notch filter 534 at an incident angle of about 90 degrees and then passes through the notch filter 534. The fluorescent light enters the second wavelength division multiplexer 132 through the second fiber 138. The dichroic mirror 532 and the notch filter 534 can each have multiple bands according to the confocal design of the light sources 111*a*-111*d*. In this case, the dichroic mirror 532 and the notch filter 534 both have four bands that block four laser wavelengths. The number of bands of the dichroic mirror 532 and the notch filter 534 can correspond to the number of the light sources 111*a*-111*d*.

The beam splitter 133 separates the side scattered light with high intensity from the fluorescent light with low intensity, reducing or preventing crosstalk of the side scattered light to the fluorescent light. In addition, by providing the beam splitter, it is possible to separate and transmit multiple light beams into two or more wavelength division multiplexers. The optical elements included in the beam splitter 133 and their configuration may be changed, and are not limited to the example shown and described herein.

In some examples, the first wavelength division multiplexer 131 receives the side scattered light beams from the beam splitter 133 via the first fiber 137 and divides optical signals of the side scattered light with different wavelengths from each other. In the first wavelength division multiplexer 131, each optical signal is transmitted along an optical transmission path 510 corresponding to an optical channel of the optical signal.

The first wavelength division multiplexer 131 includes a first filter 511 and a second filter 512 for each optical channel. The first filter 511 and the second filter 512 are arranged at a certain distance from each other along the optical transmission path of the optical channel in a non-parallel manner. Crosstalk between side scattered lights can be reduced or prevented by providing the two filters. The first and second filters 511 and 512 are not arranged in parallel so as to avoid multiple reflections of light between them and achieve a better optical density. Thereafter, the filtered light enters a light detection element 515 (e.g., a photodiode, an avalanche photodiode (APD), a photomultiplier tube) for further processing the light.

The second wavelength division multiplexer 132 receives a fluorescent beam from the beam splitter 133 via the second fiber 138, and divides the optical signals of the fluorescent beam having different wavelengths from each other. In the second wavelength division multiplexer 132, each optical signal is transmitted along an optical transmission path 520 corresponding to an optical channel of the optical signal. Since the fluorescent signal is weak, the second wavelength division multiplexer 132 includes a single filter 521 for each optical channel. Thereafter, the filtered fluorescent light enters a light detection element 525 (e.g., a photodiode, an avalanche photodiode (APD), a photomultiplier tube) for further processing.

Alternative suitable configurations for the wavelength division multiplexers may be used. For example, the first and second wavelength division multiplexers 131, 132 can include notch filters corresponding to the respective fluorescence channels. The notch filters can reduce or eliminate the crosstalk of the side scattered light to the fluorescence light. In this case, the beam splitter 133 may only include the dichroic mirror 532 with no notch filter 534.

In the side collection unit 130, a diameter of the collection fiber 136 may be different from diameters of the first fiber 137 and the second fiber 138 according to the light transmission efficiency. Lenses in the beam splitter may cause aberration, and thus the output light spots may be larger than input of the beam splitter, and the fiber diameters may be selected accordingly.

The forward collection unit 150 includes an obscuration bar 155, a concave mirror 151, a filter 157, and a forward detector 159. The obscuration bar 155 blocks a large portion of the light transmitted through the flow chamber 15 to reduce background noise created by the excitation light beams transmitting directly through the flow chamber 15, and to allow collection of only forward scattered light from the particles. In some examples, the majority of the transmitted light is blocked so as not to saturate the forward detector 159.

The concave mirror 151 reflects a forward scattered beam emitted from the particles. The filter 157 allows forward scattered light with a high signal-to-noise ratio to pass, and block other light. The forward detector 159 receives the filtered forward scattered light from the filter 157, and processes and analyzes the forward scattered light.

As further shown in FIG. 1, the detection system 100 includes an aperture device 160. In this illustrative example, the aperture device 160 is positioned in front of the focal lens 119. As will be described in more detail, the aperture device 160 is operable to adjust a size and shape of apertures to create a variety of different light intensity fringe patterns in the interrogation zone 18. The detection system 100 can use the light intensity fringe patterns generated by the aperture device 160 for enhanced particle feature extraction and particle size detection.

The aperture device 160 can improve extraction of spatial features in flow cytometry from particles having sizes greater than 1 μm. As an illustrative example, the aperture device 160 can improve extraction of spatial features including shape and morphology of particles. In one particular example, the aperture device 160 can improve extraction of spatial features from human chromosomes. Additional particles in which the aperture device 160 can improve extraction of spatial features including shape and morphology are possible.

Additionally, the aperture device 160 can improve size determinations in flow cytometry of particles having sizes less than 1 μm diameter. In some examples, the aperture device 160 can be used to detect particles having a size of 40 nm. As an illustrative example, the aperture device 160 can improve size determinations of extracellular vesicles (EVs). Additional particles in which the aperture device 160 can improve size determinations are possible.

The aperture device 160 provides a common-path interferometry for the detection system 100. This can significantly reduce errors associated with vibration, misalignment, and air turbulence in the detection system 100. Also, distance between the aperture device 160 and the interrogation zone 18 is shortened, which can further reduce detection errors.

By adjusting the size and shape of the apertures, the aperture device 160 can provide an optimal light intensity fringe pattern, such as one having an optimal number of fringes and/or an optimal width and thickness of the fringes, to improve detection sensitivity and resolution for detecting particles of interest. For example, the light intensity fringe pattern is optimized for detecting and/or analyzing particles of a particular type and/or particles having one or more particular characteristics. The particular type and/or one or more particular characteristics of the particles can be selected by a user of the detection system 100, and the aperture device 160 can adjust the size and shape of the apertures, and the distance between the apertures, to create an optimal light intensity fringe pattern based on the selected type and/or characteristics of the particles while the detection system 100 is running to get immediate results.

Figure 2:
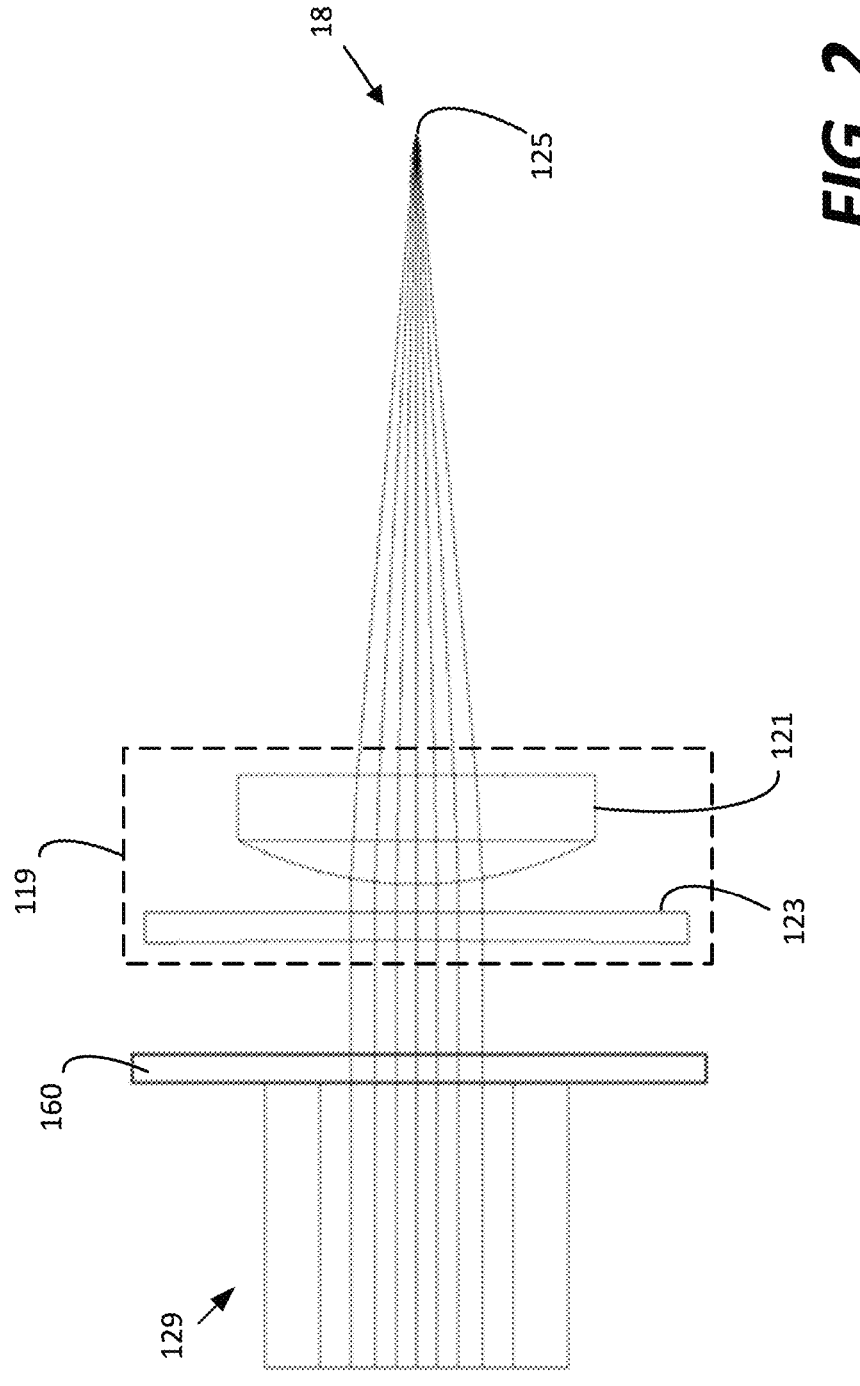
FIG. 2 is a detailed view of an example of an aperture device positioned in front of a focal lens of the detection system of FIG. 1.
Figure 3:
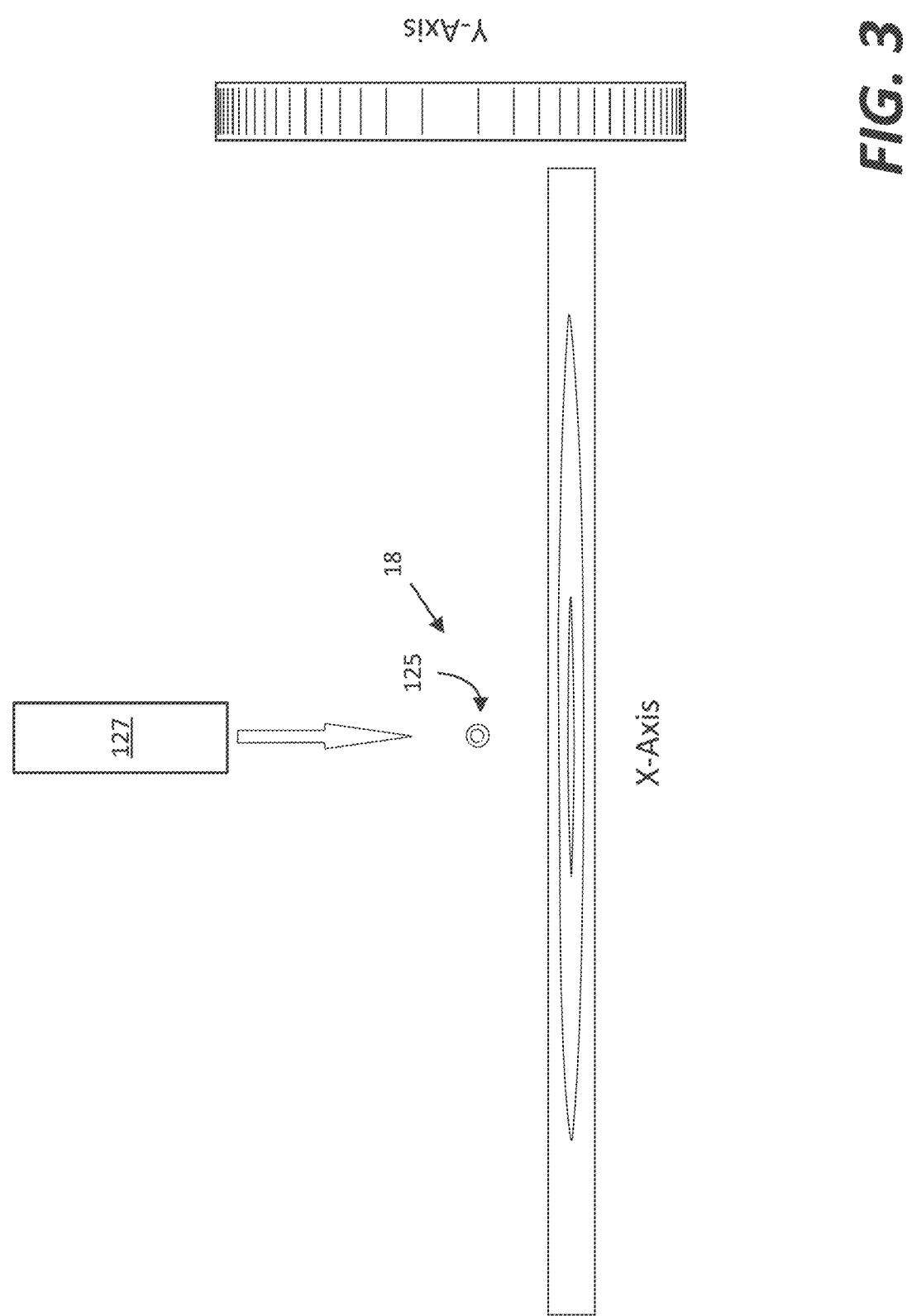
FIG. 3 illustrates an example of an excitation light beam before the aperture device of FIG. 2 creates a light intensity fringe pattern in an interrogation zone of the detection system.

FIG. 2 is a detailed view of an example of the aperture device 160 positioned in front of the focal lens 119. FIG. 3 illustrates an example of the excitation light beam in the interrogation zone 18 before the aperture device 160 create a light intensity fringe pattern in the interrogation zone 18. Referring now to FIGS. 2 and 3, the focal lens 119 shapes the excitation light beam in the interrogation zone 18. For example, FIG. 2 shows the excitation light beam is transformed into a collimated beam 129 before it reaches the focal lens 119, and the focal lens 119 converges the collimated beam 129 into a single focal point 125 for providing an irradiance distribution in the interrogation zone 18. In FIG. 3, a stream of particles 127 passes through the single focal point 125 in a direction along the y-axis. In alternative examples, the stream of particles 127 can pass through the single focal point 125 in a direction along the x-axis.

In this example, the focal lens 119 includes a first lens 121 having a short focal length. In some examples, the first lens 121 is a spherical lens. In other examples, the first lens 121 is an aspherical lens. The first lens 121 shapes the excitation light beam into the single focal point 125 in the interrogation zone 18. In some examples, the first lens 121 determines a height (y-axis) of the single focal point 125 of the excitation light beam in the interrogation zone 18.

In the example shown in FIG. 2, the focal lens 119 further includes a second lens 123 having a longer focal length the first lens 121. In some examples, the second lens 123 is a cylindrical lens. The second lens 123 extends the single focal point 125 shaped by the first lens 121 in a horizontal direction (x-axis). In alternative examples, the second lens 123 is optional.

Figure 4:
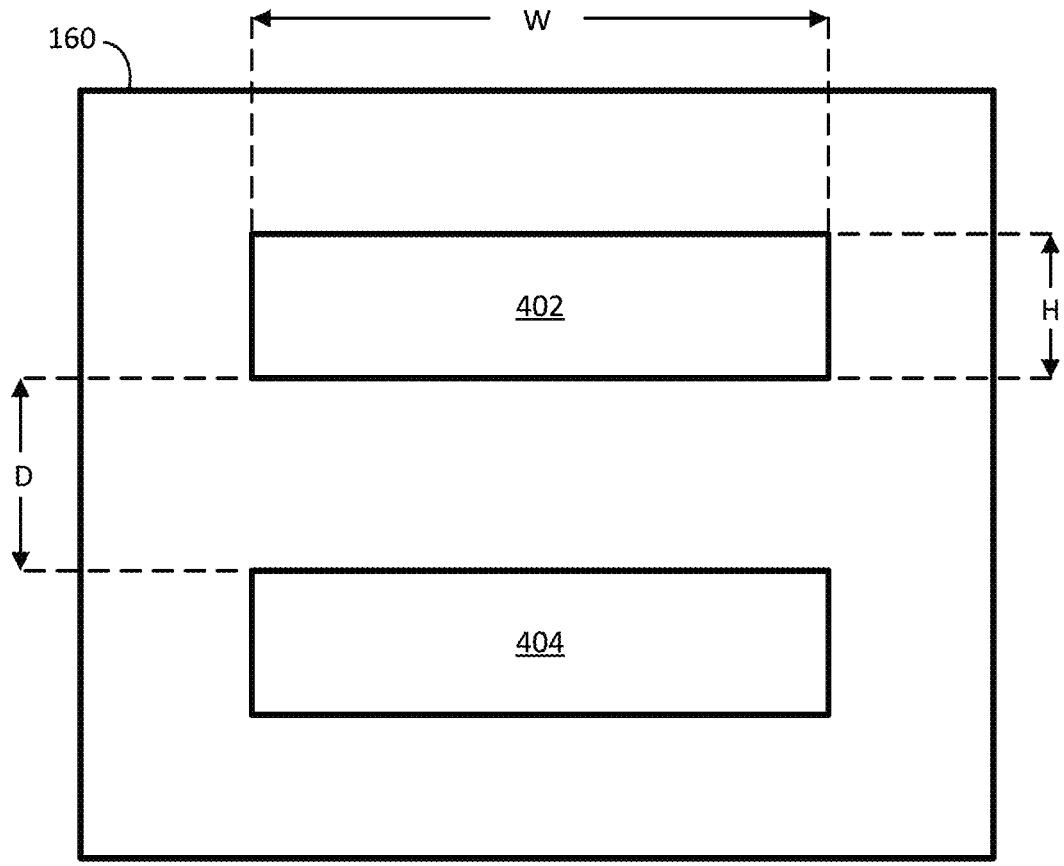
FIG. 4 is a front view of an example of the aperture device of FIG. 2.

As further shown in FIG. 2, the aperture device 160 is positioned in front of the focal lens 119. FIG. 4 is a front view of the aperture device 160. Referring now to FIGS. 2 and 4, the aperture device 160 creates a light intensity fringe pattern at a focal plane of the first lens 121 in the interrogation zone 18 of the detection system 100. Illustrative examples of the light intensity fringe patterns created by the aperture device 160 will be described in more detail below with reference to FIGS. 7-10. When the focal lens includes the second lens 123, the second lens 123 stretches the light intensity fringe pattern in the horizontal direction (x-axis).

Referring now to FIGS. 1, 2, and 4, one or more excitation light beams from the one or more light sources 111a-111b of the light emitting unit 110 pass through the beam expanders 113a-113d where the one or more excitation light beams become the collimated beam 129 shown in FIG. 2. The collimated beam 129 has a diameter of a predetermined size. The predetermined size of the collimated beam 129 should be larger than the sizes of first and second apertures 402, 404 of the aperture device 160. A portion of the collimated beam 129 passes through the first and second apertures 402, 404 of the aperture device 160, while a remaining portion of the collimated beam 129 is blocked. The portion of the collimated beam 129 that passes through the first and second apertures 402, 404 is transformed into two separate beams each having a shape corresponding to the first and second apertures 402, 404.

The focal lens 119 focuses the two beams that pass through the first and second apertures 402, 404 at the focal plane of the first lens 121 in the interrogation zone 18 of the detection system 100. The two beams of coherent radiation overlap at the focal plane creating a light intensity fringe pattern at the interrogation zone 18 due to interference. When the stream of particles 127 passes through the light intensity fringe pattern, the particles causes light oscillation in all detection channels of the detection system 100. Detectors (e.g., forward detector 159, light detection elements 515, 525) convert the oscillating light into electrical signals that are digitized and recorded for processing by a computing system 1300 of the detection system 100. The computing system 1300 will be described in more detail with reference to FIG. 13.

In the example provided in FIG. 4, the first and second apertures 402, 404 each have the same shape and size. For example, the first and second apertures 402, 404 each have a rectangular shape having a width W and a height H. Also, the first and second apertures 402, 404 are spaced apart by a distance D. As will be described in more detail, the aperture device 160 is configurable to adjust the size of the first and second apertures 402, 404. For example, the aperture device 160 is configurable to adjust the width W and the height H of each of the first and second apertures 402, 404. Additionally, the aperture device 160 is configurable to adjust the distance D spaced between the first and second apertures 402, 404. By adjusting the size of the first and second apertures 402, 404 and/or the distance D between the first and second apertures 402, 404, different light intensity fringe patterns are generated in the interrogation zone 18.

In alternative examples, the aperture device 160 can include more than two apertures. In further alternative examples, the aperture device 160 can include a single aperture. Additionally, while the example provided in FIG. 4 illustrates the first and second apertures 402, 404 as each having a rectangular shape, it is possible for the first and second apertures 402, 404 to have additional types of shapes including hexagon or octagon shapes, or can have circular shapes. In further examples, the first aperture 402 can have a first shape and a first size, and the second aperture 404 can have a second shape and a second size, where at least one of the second shape and the second size is different from the first shape and the first size.

Figure 5:
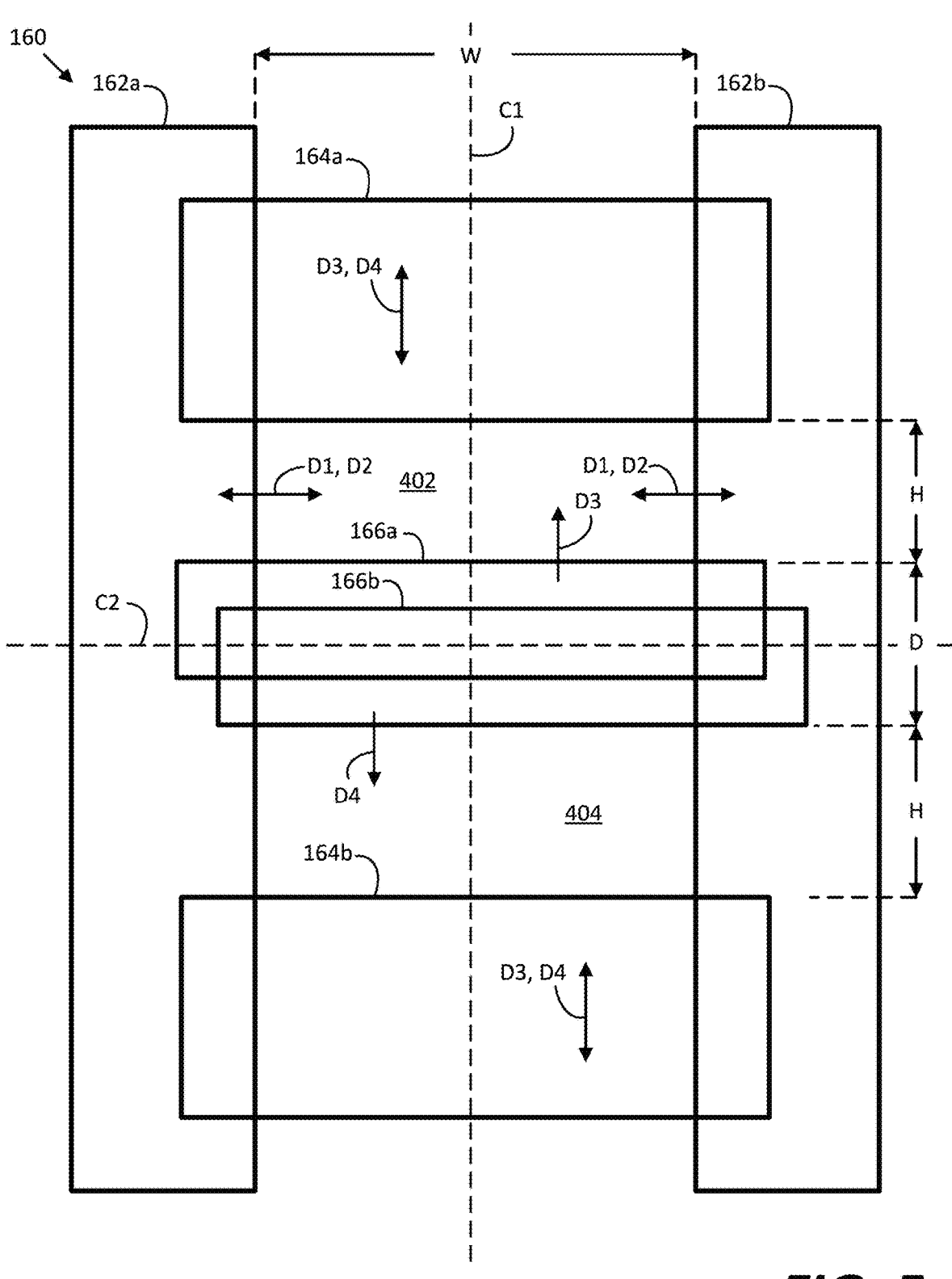
FIG. 5 schematically illustrates an example configuration of components of the aperture device of FIG. 2 that are positionable to adjust a size of first and second apertures, and a distance spaced between the first and second apertures.
Figure 6:
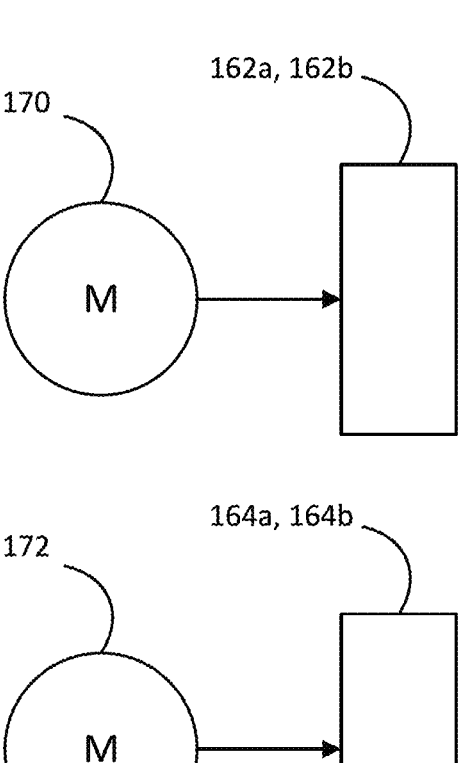
FIG. 6 schematically illustrates an example configuration for positioning the components of the aperture device shown in FIG. 5.
Figure 6:
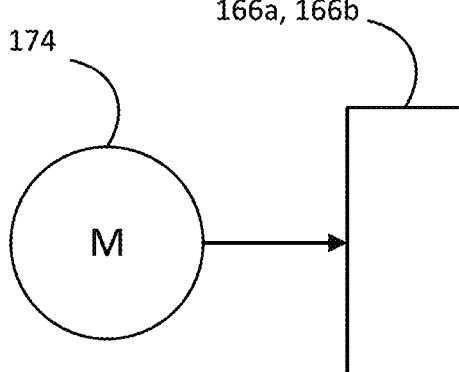

FIG. 5 schematically illustrates an example configuration of components of the aperture device 160 that are positionable to adjust a size of the first and second apertures 402, 404 including the width W and height H of the first and second apertures 402, 404, and the distance D spaced between the first and second apertures 402, 404. FIG. 6 schematically illustrates an example configuration for positioning the components of the aperture device 160. Referring now to the example shown in FIGS. 5 and 6, the aperture device 160 includes first and second lateral components 162a, 162b, first and second longitudinal components 164a, 164b, and first and second medial components 166a, 166b. As will be described in more detail below, the first and second lateral components 162a, 162b, the first and second longitudinal components 164a, 164b, and the first and second medial components 166a, 166b are positionable to adjust the size of the first and second apertures 402, 404 (including the width W and/or height H), and to also adjust the distance D spaced between the first and second apertures 402, 404.

In alternative examples, the aperture device 160 may include a different configuration of components for adjusting the size and/or shape of the first and second apertures 402, 404, and the distance D spaced between the first and second apertures 402, 404. For example, when the first and second apertures 402, 404 have a hexagon, octagon, or circular shape, the aperture device 160 can include first and second sets of aperture blades that open and close to increase and decrease diameters of the first and second apertures similar to aperture blades of a camera.

As shown in FIG. 5, the first and second lateral components 162a, 162b are positionable in opposing first and second directions D1, D2 relative to a first centerline C1 to adjust the widths W of the first and second apertures 402, 404. In this example, the first centerline C1 runs parallel to the heights H of the first and second apertures 402, 404.

As shown in FIG. 6, the first and second lateral components 162a, 162b are connected to a first motor 170 that can be controlled to actuate the movement of the first and second lateral components 162a, 162b in the first and second directions D1, D2. In alternative examples, the first and second lateral components 162a, 162b can each be individually connected to a dedicated motor for movement in the first and second directions D1, D2.

As an illustrative example, the first and second lateral components 162a, 162b can each move away from the first centerline C1 to increase the widths W of the first and second apertures 402, 404, and can each move toward the first centerline C1 to decrease the widths W of the first and second apertures 402, 404. For example, the first lateral component 162a can move in the first direction D1 (e.g., leftward) while the second lateral component 162b can move in the second direction D2 (e.g., rightward) to increase the widths W of the first and second apertures 402, 404. As a further example, the first lateral component 162a can move in the second direction D2 (e.g., rightward) while the second lateral component 162b can move in the first direction D1 (e.g., leftward) to decrease the widths W of the first and second apertures 402, 404.

The first and second longitudinal components 164a, 164b and the first and second medial components 166a, 166b are positionable in opposing third and fourth directions D3, D4 relative to a second centerline C2 to adjust the heights H of the first and second apertures 402, 404, and the distance D between the first and second apertures 402, 404. The second centerline C2 runs parallel to the widths W of the first and second apertures 402, 404 such that the third and fourth directions D3, D4 are orthogonal to the first and second directions D1, D2.

As shown in FIG. 6, the first and second longitudinal components 164a, 164b are connected to a second motor 172 that can be controlled to actuate the movement of the first and second longitudinal components 164a, 164b in the third and fourth directions D3, D4. In other examples, the first and second longitudinal components 164a, 164b can each be individually connected to a dedicated motor for movement in the third and fourth directions D3, D4.

As further shown in FIG. 6, the first and second medial components 166a, 166b are connected to a third motor 174 that can be controlled to actuate the movement of the first and second medial components 166a, 166b in the third and fourth directions D3, D4. In other examples, the first and second medial components 166a, 166b can each be individually connected to a dedicated motor for movement in the third and fourth directions D3, D4.

As an illustrative example, the first and second longitudinal components 164a, 164b can each move away from the second centerline C2 to increase the heights H of the first and second apertures 402, 404, and can each move toward the second centerline C2 to decrease the heights H of the first and second apertures 402, 404. For example, the first longitudinal component 164a can move in the third direction D3 (e.g., upward) to increase the height H of the first aperture 402. Also, the second longitudinal component 164b can move in the fourth direction D4 (e.g., downward) to increase the height H of the second aperture 404.

In further illustrative examples, the first longitudinal component 164a can move in the third direction D3 (e.g., upward) and the first medial component 166a can move in the fourth direction D4 (e.g., downward) to increase the height H of the first aperture 402. Also, the second longitudinal component 164b can move in the fourth direction D4 (e.g., downward) and the second medial component 166b can move in the third direction D3 (e.g., upward) to increase the height H of the second aperture 404. Additional examples for increasing the heights H of the first and second apertures 402, 404 defined by the aperture device 160 are possible.

As another illustrative example, the first longitudinal component 164a can move in the fourth direction D4 (e.g., downward) to decrease the height H of the first aperture 402. Additionally, the second longitudinal component 164b can move in the third direction D3 (e.g., upward) to decrease the height H of the second aperture 404.

In further illustrative examples, the first longitudinal component 164a can move in the fourth direction D4 (e.g., downward) and the first medial component 166a can move in the third direction D3 (e.g., upward) to decrease the height H of the first aperture 402. Also, the second longitudinal component 164b can move in the third direction D3 (e.g., upward) and the second medial component 166b can move in the fourth direction D4 (e.g., downward) to decrease the height H of the second aperture 404. Additional examples for decreasing the heights H of the first and second apertures 402, 404 defined by the aperture device 160 are possible.

The first and second medial components 166a, 166b are positionable in opposing third and fourth directions D3, D4 relative to the second centerline C2 to adjust the distance D between the first and second apertures 402, 404. For example, the first medial component 166a can move in the third direction (e.g., upward) and the second medial component 166b can move in the fourth direction (e.g., downward) to increase the distance D between first and second apertures 402, 404. Also, the first medial component 166a can move in the fourth direction (e.g., downward) while the second medial component 166b moves in the third direction (e.g., upward) to decrease the distance D between first and second apertures 402, 404.

Figure 7:
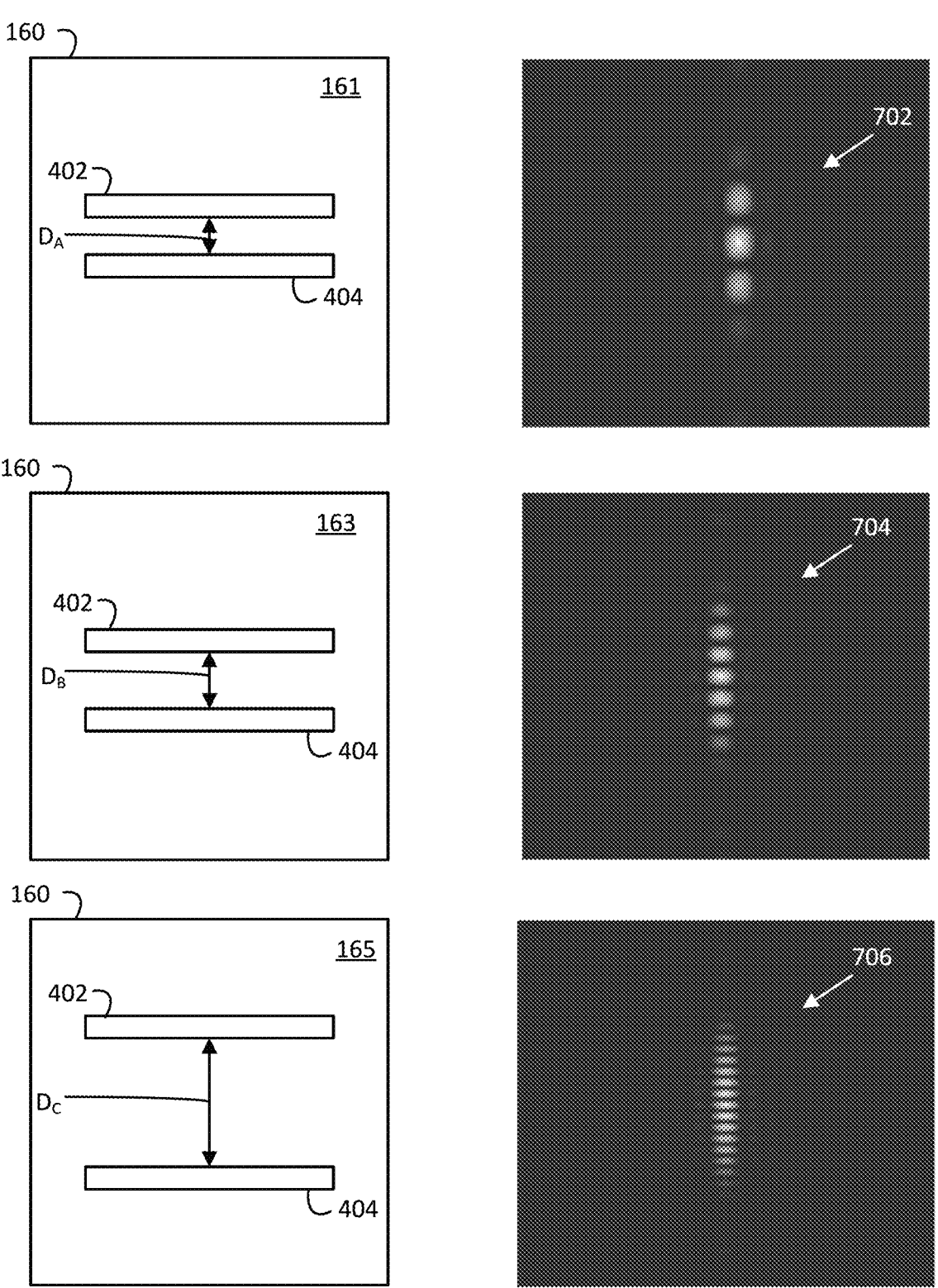
FIG. 7 provides an illustrative example of adjustments to a distance between first and second apertures of the aperture device of FIG. 4 causing different corresponding light intensity fringe patterns at the interrogation zone of the detection system of FIG. 1.

FIG. 7 provides an illustrative example of adjustments to the distance D between the first and second apertures 402, 404 of the aperture device 160 causing different corresponding light intensity fringe patterns 702-706 at the interrogation zone 18. In this example, the width W and the height H of the first and second apertures 402, 404 remain constant, and the focal lens 119 includes only the first lens 121 (e.g., an aspherical lens) since the second lens 123 (e.g., cylindrical lens) is optional. In examples where the second lens 123 is included in the focal lens 119, the second lens 123 stretches the fringe patterns in the horizontal direction (x-axis).

As shown in FIG. 7, the aperture device 160 is configurable to have a first configuration 161 where the first and second apertures 402, 404 are spaced apart by a first distance DA creating a first light intensity fringe pattern 702, a second configuration 163 where the first and second apertures 402, 404 are spaced apart by a second distance DB creating a second light intensity fringe pattern 704, and a third configuration 165 where the first and second apertures 402, 404 are spaced apart by a third distance Dc creating a third light intensity fringe pattern 702. Additional configurations for adjusting the distance D between the first and second apertures 402, 404 are possible for creating additional light intensity fringe patterns.

As the distance between the first and second apertures 402, 404 increases, the light intensity fringe patterns 702-706 become more compact at the interrogation zone 18. For example, the number of fringes increases and the spacing between the fringes decreases in the light intensity fringe patterns 702-706 as the distance between the first and second apertures 402, 404 increases. The stream of particles 127 passes through the light intensity fringe patterns 702-706 generated at the interrogation zone 18 in the direction along the y-axis. The shape, size, and number of fringes in the light intensity fringe pattern can be altered by adjusting the distance D between the first and second apertures 402, 404 to provide an optimal light intensity fringe pattern for collecting data on the particles. The detection system 100 can automatically adjust the distance D between the first and second apertures 402, 404 on demand to generate an optimal light intensity fringe pattern for analyzing particular types of particles, and/or analyzing particular characteristics of the particles, as desired by a user of the detection system 100.

Figure 8:
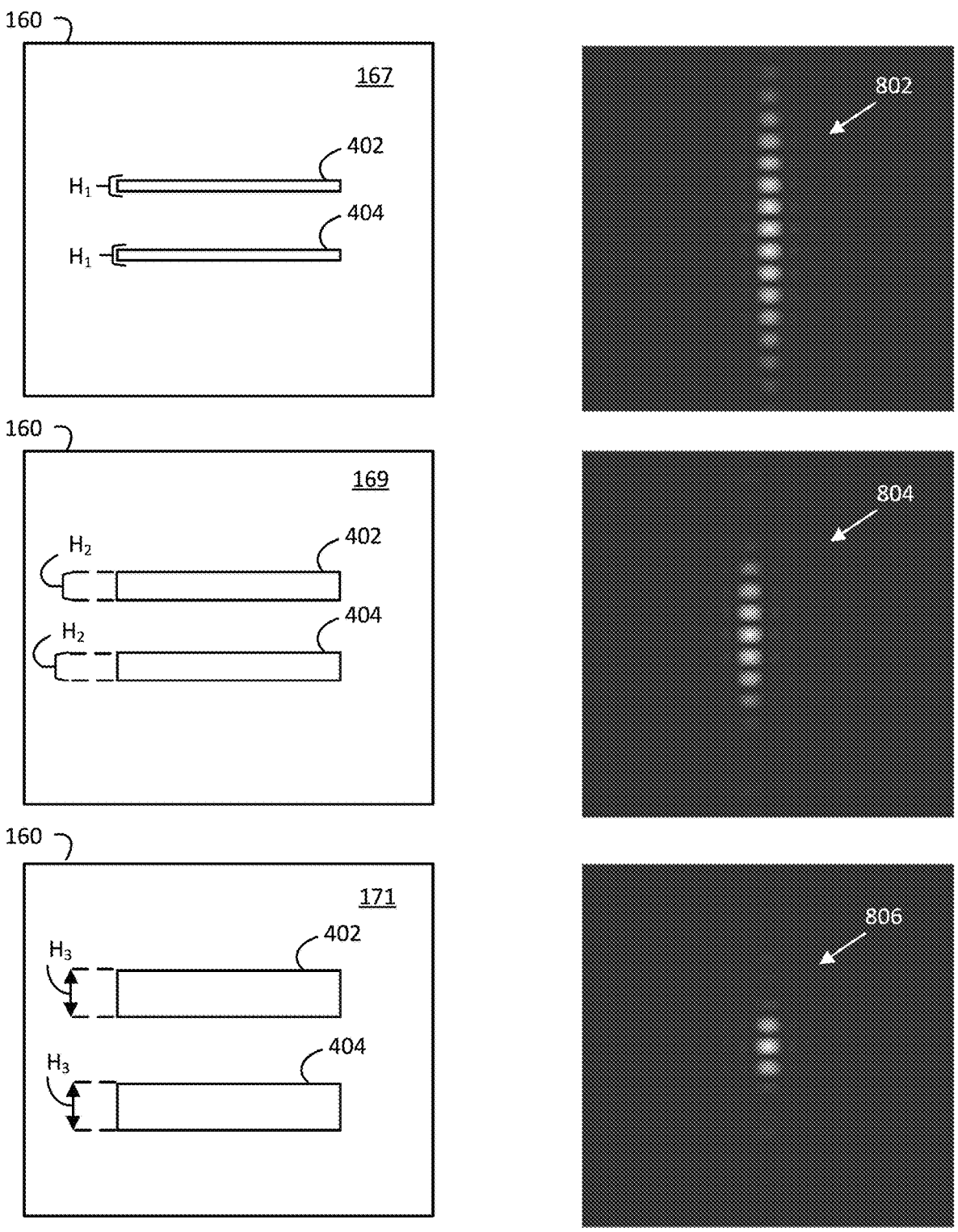
FIG. 8 provides an illustrative example of adjustments to heights of the first and second apertures of the aperture device of FIG. 4 causing different corresponding light intensity fringe patterns at the interrogation zone of the detection system of FIG. 1.

FIG. 8 provides an illustrative example of adjustments to the heights H of the first and second apertures 402, 404 of the aperture device 160 causing different corresponding light intensity fringe patterns 802-806 at the interrogation zone 18 of the detection system 100. In this example, the width W of the first and second apertures 402, 404 remains constant, and the distance D between the first and second apertures 402, 404 also remains constant. Like in the example of FIG. 7, the focal lens 119 includes only the first lens 121 (e.g., an aspherical lens) since the second lens 123 (e.g., cylindrical lens) is optional. In examples where the focal lens 119 includes the second lens 123, the light intensity fringe patterns 802-806 shown in FIG. 8 are stretched in the horizontal direction (x-axis) by the second lens 123.

In FIG. 8, the aperture device 160 is configurable to have a fourth configuration 167 where the first and second apertures 402, 404 each have a height Hi, a fifth configuration 169 where the first and second apertures 402, 404 each have a height Hz, and a sixth configuration 171 where the first and second apertures 402, 404 each have a height H3. Additional configurations for adjusting the height H of the first and second apertures 402, 404 are possible.

As shown in FIG. 8, as the height H of the first and second apertures 402, 404 increases, the light intensity fringe patterns 802-806 generated at the interrogation zone 18 become shorter. For example, the flight intensity fringe pattern 806 generated by the first and second apertures 402, 404 each having the height H3 is shorter and includes a fewer number of fringes than the light intensity fringe pattern 802 generated by the first and second apertures 402, 404 each having the height Hi. As described above, the different light intensity fringe patterns provide additional data collection from the stream of particles 127. The detection system 100 can automatically adjust the heights H of the first and second apertures 402, 404 on demand to generate an optimal light intensity fringe pattern for analyzing particular types of particles, and/or analyzing particular characteristics of the particles that pass through the interrogation zone 18, as desired by a user of the detection system 100.

While the first and second apertures 402, 404 each have the same relative height H in each of configurations shown in FIG. 8, it is contemplated that the detection system 100 can adjust the heights H of the first and second apertures 402, 404 to be different for further customization. For example, the detection system 100 can control the aperture device 160 such that the height H of the first aperture 402 is larger than the height H of the second aperture 404, or conversely, the detection system 100 can control the aperture device 160 such that the height H of the first aperture 402 is smaller than the height H of the second aperture 404.

Figure 9:
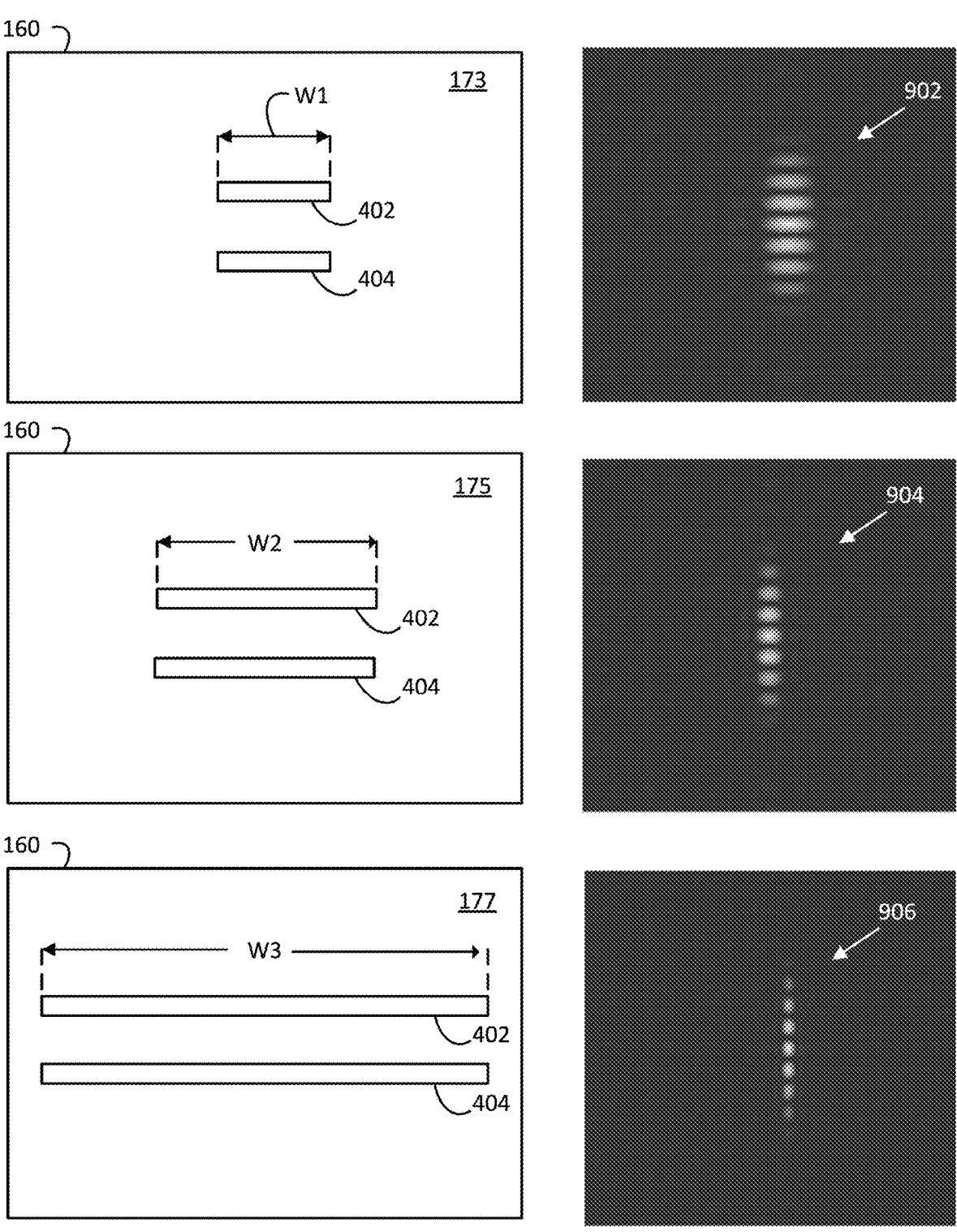
FIG. 9 provides an illustrative example of adjustments to widths of the first and second apertures of the aperture device of FIG. 4 causing different corresponding light intensity fringe patterns at the interrogation zone of the detection system of FIG. 1.

FIG. 9 provides an illustrative example of adjustments to the widths W of the first and second apertures 402, 404 of the aperture device 160 causing different corresponding light intensity fringe patterns 902-906 at the interrogation zone 18. In this example, the height H of the first and second apertures 402, 404 remains constant, and the distance D between the first and second apertures 402, 404 also remains constant. Like in the examples of FIGS. 7 and 8, the focal lens 119 includes only the first lens 121 (e.g., an aspherical lens) since the second lens 123 (e.g., cylindrical lens) is optional. In examples where the second lens 123 is included in the focal lens 119, the second lens 123 stretches the fringe patterns in the horizontal direction (x-axis).

In FIG. 9, the aperture device 160 is configurable to have a seventh configuration 173 where the first and second apertures 402, 404 each have a width W1, an eighth configuration 175 where the first and second apertures 402, 404 each have a width W2, and a ninth configuration 177 where the first and second apertures 402, 404 each have a width W3. Additional configurations for adjusting the width W of the first and second apertures 402, 404 are possible.

As shown in FIG. 9, as the width W of the first and second apertures 402, 404 increases, the light intensity fringe pattern 902-906 generated at the interrogation zone 18 becomes narrower. For example, the light intensity fringe pattern 906 generated by the first and second apertures 402, 404 each having the width W3 is narrower than the light intensity fringe pattern 902 generated by the first and second apertures 402, 404 each having the width W1. The detection system 100 can automatically adjust the widths W of the first and second apertures 402, 404 on demand to generate an optimal light intensity fringe pattern for analyzing particular types of particles, and/or analyzing particular characteristics of the particles that pass through the interrogation zone 18, as desired by a user of the detection system 100.

While the first and second apertures 402, 404 each have the same relative width W in each of configurations shown in FIG. 9, it is contemplated that the detection system 100 can adjust the widths W of the first and second apertures 402, 404 to be different for further customization. For example, the detection system 100 can control the aperture device 160 such that the width W of the first aperture 402 is larger than the width W of the second aperture 404, or conversely, the detection system 100 can control the aperture device 160 such that the width W of the first aperture 402 is smaller than the width W of the second aperture 404.

Figure 10:
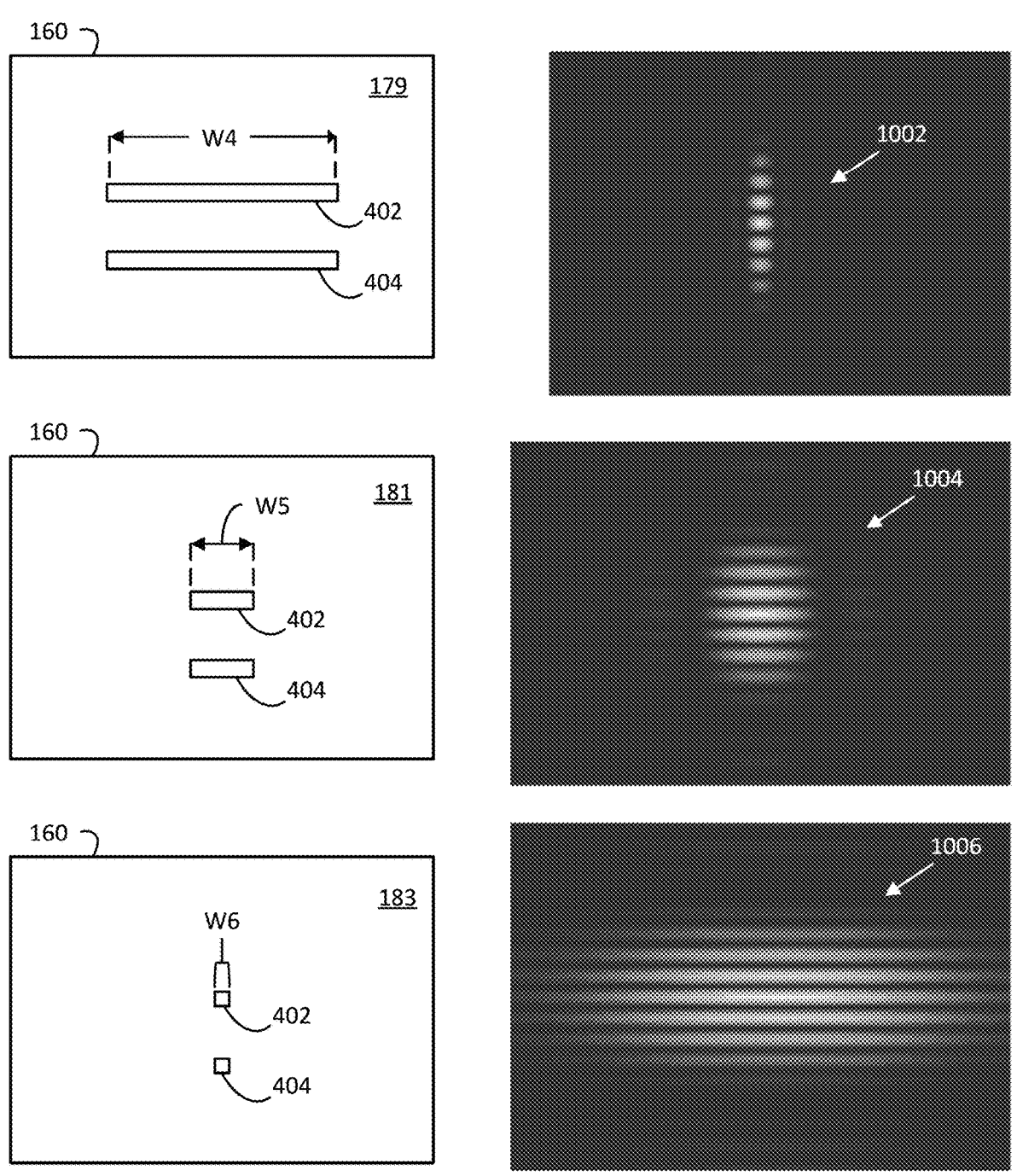
FIG. 10 provides another illustrative example of adjustments to the widths of the first and second apertures of the aperture device of FIG. 4 causing different corresponding light intensity fringe patterns at the interrogation zone of the detection system of FIG. 1.

FIG. 10 provides another illustrative example of adjustments to the width W of the first and second apertures 402, 404 of the aperture device 160 causing different corresponding light intensity fringe patterns 1002-1004 at the interrogation zone 18. In this example, the height H of the first and second apertures 402, 404 remains constant, and the distance D between the first and second apertures 402, 404 remains constant. In this example, the second lens 123 (e.g., cylindrical lens) in the focal lens 119 is replaced by the aperture device 160 to show how adjustments to the width W of the first and second apertures 402, 404 cause the width of the light intensity fringe patterns 1002-1004 to either increase or decrease. As the widths W of the first and second apertures 402, 404 decreases, the light intensity fringe patterns in the interrogation zone 18 increasingly extend in the horizontal direction (x-axis). For example, the width of the light intensity fringe pattern 1006 generated by the first and second apertures 402, 404 having the width W6 is larger than the width of the light intensity fringe pattern 1002 generated by the first and second apertures 402, 404 having the width W4.

In addition to the foregoing illustrative examples shown in FIGS. 7-10, a variety of combinations of the height H, the width W, and/or the distance D between the first and second apertures 402, 404 can be adjusted on the aperture device 160 to create customized light intensity fringe patterns having a desired shape, size, and number of fringes at the interrogation zone 18. For example, both the height H and the width W of the first and second apertures 402, 404 can be adjusted. As another example, both the height H and the distance D between the first and second apertures 402, 404 can be adjusted. As another example, both the width W and the distance D between the first and second apertures 402, 404 can be adjusted. In another example, the height H, the width W, and the distance D between the first and second apertures 402, 404 can all be adjusted. Additional examples of adjusting the shape, size, and orientation of the first and second apertures 402, 404 on the aperture device 160 are possible to provide customized light intensity fringe patterns at the interrogation zone 18 of the detection system 100.

The light intensity fringe patterns created by the aperture device 160, as shown in the examples provided in FIGS. 7-10, provides advantages over the single focal point 125 shown in FIG. 3 because the light intensity fringe patterns allow for the stream of particles 127 to pass through multiple interrogation spots instead of a single interrogation spot. By providing multiple interrogation spots, the detection system 100 is able to collect additional data as the stream of particles 127 pass through the fringes of the light intensity fringe patterns. This additional data can be used to analyze additional properties and characteristics of the particles not possible with the single focal point 125 of FIG. 3. For example, the multiple interrogation spots provided by the light intensity fringe patterns can be used by the detection system 100 to detect spatial features of the particles including shape and morphology of the particles. Additionally, or alternatively, the light intensity fringe patterns can improve detection sensitivity for smaller particles such as particles that are less than 1 μm in diameter. In some examples, the light intensity fringe patterns can detect particles having a size as small as 40 nm.

Figure 11:
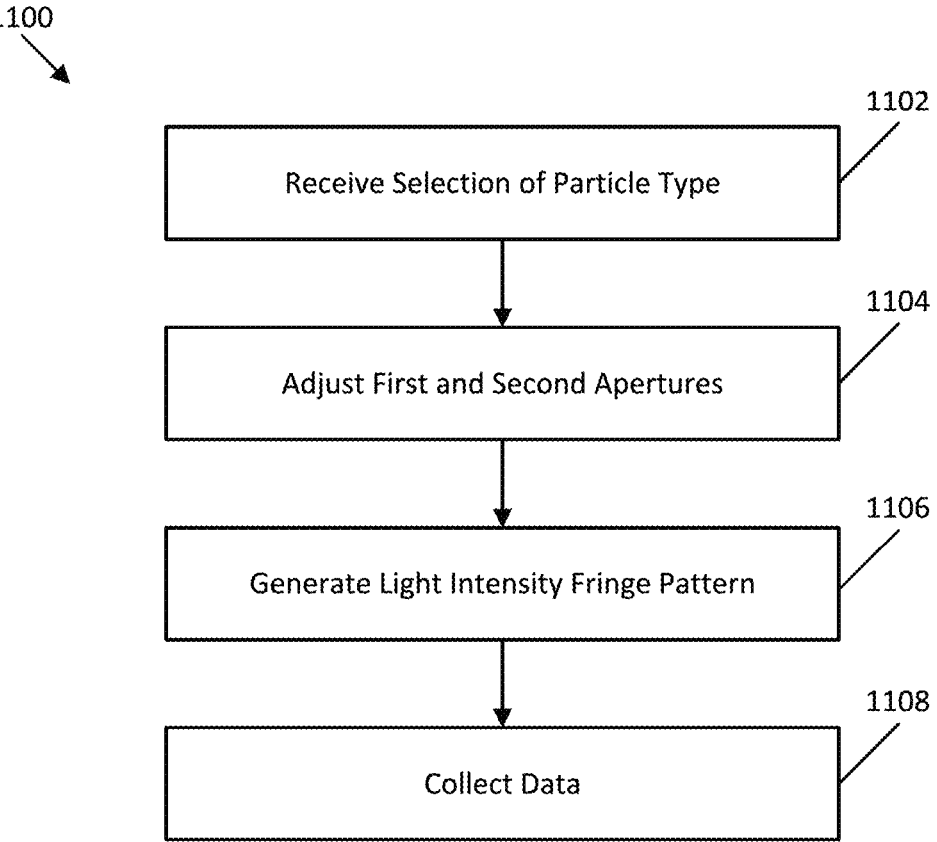
FIG. 11 schematically illustrates an example of a method of operating the detection system of FIG. 1 to analyze a stream of particles.

FIG. 11 schematically illustrates an example of a method 1100 of operating the detection system 100 to analyze the stream of particles 127. The method 1100 includes an operation 1102 of receiving a selection of a type and/or one or more characteristics of particles for analysis by the detection system 100. The type and/or one or more characteristics of particles can be selected by a user using a user interface 1324 of the detection system 100 (see FIG. 13). Examples of the user interface 1324 can include a touchscreen that operates as both a display and an input device, and/or one or more buttons (e.g., pushbuttons, keyboard, and the like). The user interface 1324 is operable to receive inputs from a user of the detection system 100 such as a selection of the type and/or one or more characteristics of particles for optimization of a light intensity fringe pattern generated by the aperture device 160 for analyzing the given particles.

The method 1100 includes an operation 1104 of adjusting the first and second apertures 402, 404 on the aperture device 160 based on the type and/or the one or more characteristics of the particle received in operation 1102. The size of the first and second apertures 402, 404 including at least one of the height H and the width W, and/or the distance D between the first and second apertures 402, 204 are adjusted in operation 1104 to provide an optimal light intensity fringe pattern at the interrogation zone 18 for detecting and/or analyzing particles having the type and/or one or more characteristics received in operation 1102. A variety of combinations of adjustments to the height H, the width W, and/or the distance D between the first and second apertures 402, 404 can be performed on the aperture device 160 to create light intensity fringe patterns having an optimal size and shape at the interrogation zone 18.

Figure 13:
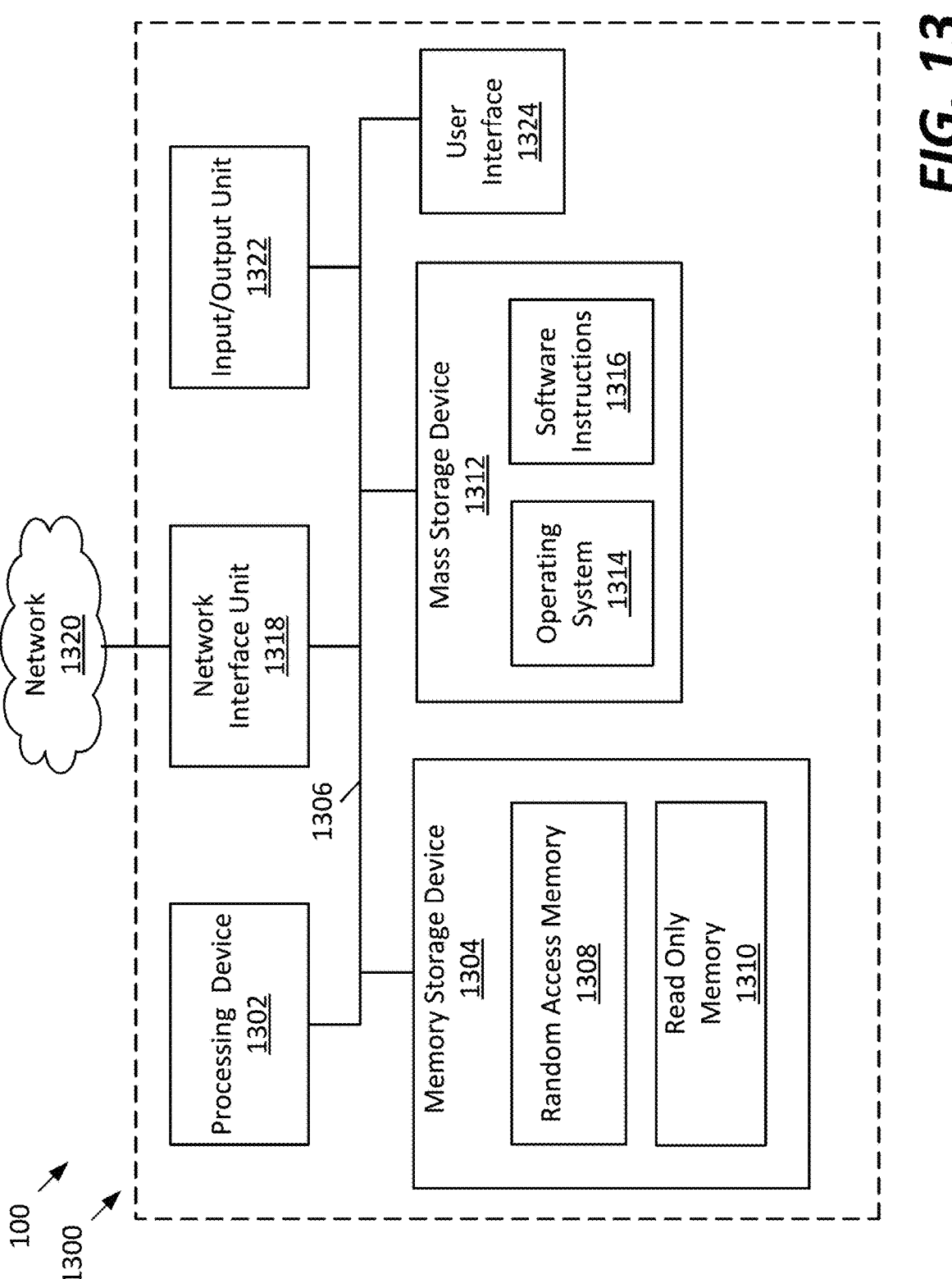
FIG. 13 schematically illustrates an example of a computing system for implementing aspects of the detection system of FIG. 1.

In some examples, operation 1104 can include retrieving a predefined size of the first and second apertures 402, 204 and/or a predefined distance spaced between the first and second apertures 402, 204 from a lookup table stored in at least one of a memory storage device 1304 and a mass storage device 1312 of the computing system 1300 (see FIG. 13). In such examples, the lookup table can include predefined settings and/or configurations for the aperture device 160 (including a size, shape, and/or distance between one or more apertures) associated with optimal light intensity fringe patterns for detecting and analyzing particular types of particles.

Next, the method 1100 includes an operation 1106 of generating a light intensity fringe pattern at the interrogation zone 18 using the aperture device 160 as adjusted in operation 1104, and the one or more light sources 111a-111b of the light emitting unit 110.

Figure 12:
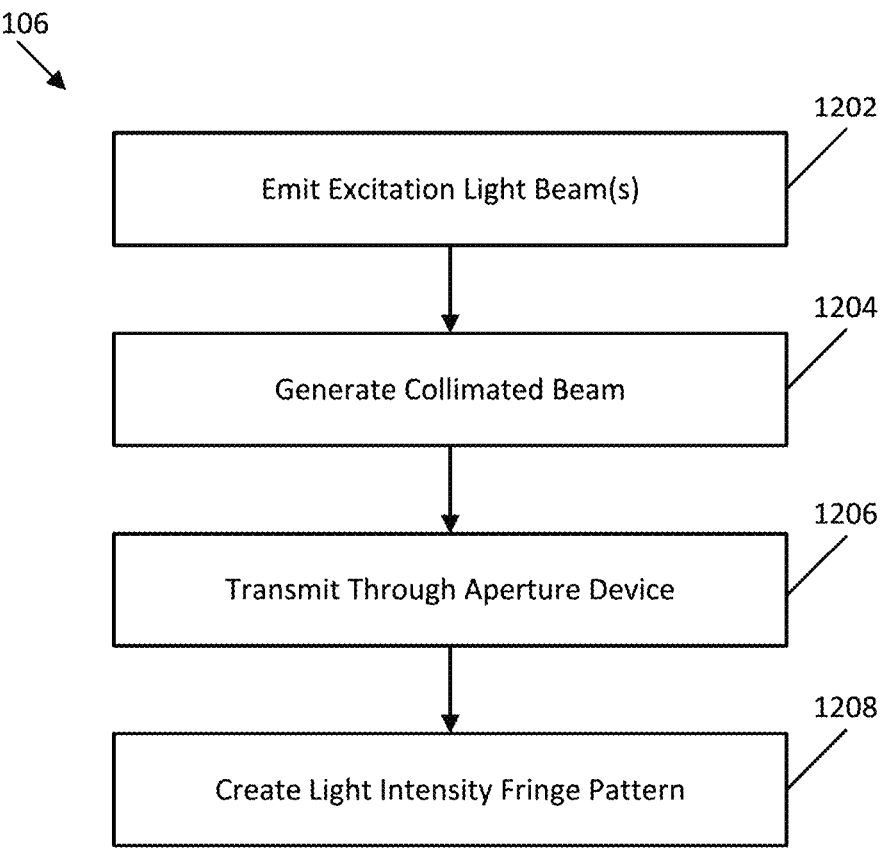
FIG. 12 illustrates an example of an operation in the method of FIG. 11.

FIG. 12 illustrates in more detail an example of operation 1106 in the method 1100. Operation 1106 can include a step 1202 of emitting one or more excitation light beams from the one or more light sources 111a-111b of the light emitting unit 110. Operation 1106 can include a step 1204 of generating the collimated beam 129 (see FIG. 2) by passing the one or more excitation light beams through the beam expanders 113a-113d. Operation 1106 can include a step 1206 of transmitting a portion of the collimated beam 129 through the first and second apertures 402, 404 and blocking a remaining portion of the collimated beam 129 using the aperture device 160. Operation 1106 can further include a step 1208 of creating a light intensity fringe pattern due to interference by using the focal lens 119 to cause the two beams that pass through the first and second apertures 402, 404 to overlap at the interrogation zone 18.

Referring back to FIG. 11, the method 1100 further includes an operation 1108 of collecting data from the stream of particles 127 passing through the light intensity fringe pattern generated in operation 1106. When the stream of particles 127 passes through the light intensity fringe pattern, the particles causes light oscillation in all detection channels of the detection system 100. For example, one or more detectors such as the forward detector 159, and/or the light detection elements 515, 525 convert the oscillating light into electrical signals that are digitized and recorded for processing by the computing system 1300 of the detection system 100.

FIG. 13 schematically illustrates an example of the computing system 1300 for implementing aspects of the detection system 100. The computing system 1300 can be used to adjust the size and shape of the first and second apertures 402, 404, as well as the distance between the first and second apertures 402, 404. For example, the computing system 1300 can control the first, second, and third motors 170, 172, 174 to position the first and second lateral components 162a, 162b, the first and second longitudinal components 164a, 164b, and the first and second medial components 166a, 166b into a desired configuration.

As shown in FIG. 13, the computing system 1300 of the detection system 100 includes one or more processing devices 1302, a memory storage device 1304, and a system bus 1306 that couples the memory storage device 1304 to the one or more processing devices 1302. The one or more processing devices 1302 can include central processing units (CPU).

The memory storage device 1304 can include a random-access memory ("RAM") 1308 and a read-only memory ("ROM") 1310. Basic input and output logic having basic routines transferring information between elements in the detection system 100 can be stored in the ROM 1310. The detection system 100 can additionally include a mass storage device 1312 that can store an operating system 1314 and software instructions 1316. The mass storage device 1312 is connected to the processing device 1302 through the system bus 1306. The mass storage device 1312 and computer-readable data storage media provide non-volatile, non-transitory computer memory storage for the detection system 100.

Although the description of computer-readable data storage media contained herein refers to the mass storage device 1312, it should be appreciated by those skilled in the art that computer-readable data storage media can be any available non-transitory, physical device or article of manufacture from which the detection system 100 can read data and/or instructions. The computer-readable storage media can be comprised of entirely non-transitory media. The mass storage device 1312 is an example of a computer-readable storage device.

Computer-readable data storage media include volatile and non-volatile, removable, and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

The detection system 100 can operate in a networked environment using logical connections to the other devices through the communications network 1320. The detection system 100 connects to the communications network 1320 through a network interface unit 1318 connected to the system bus 1306. The network interface unit 1318 can also connect to other types of communications networks and devices, including through Bluetooth, Wi-Fi, and cellular telecommunications networks including 4G and 5G networks. The network interface unit 1318 can connect the detection system 100 to additional networks, systems, and devices. The detection system 100 also includes an input/ output unit 1322 for receiving and processing inputs and outputs from one or more peripheral devices, and the user interface 1324.

The mass storage device 1312 and the RAM 1308 can store software instructions and data. The software instructions can include an operating system 1314 suitable for controlling the operation of the detection system 100. The mass storage device 1312 and/or the RAM 1308 can also store the software instructions 1316, which when executed by the processing device 1302, provide the functionality of the detection system 100 discussed herein.

The various embodiments described above are provided by way of illustration only and should not be construed to be limiting in any way. Various modifications can be made to the embodiments described above without departing from the true spirit and scope of the disclosure.

What is claimed is:

1. A detection system for analyzing particles, the detection system comprising:
   a light emitting unit generating an excitation light beam;
   an aperture device positioned in an optical path of the excitation light beam, the aperture device including:
      a first aperture; and
      a second aperture spaced apart from the first aperture by a distance, the first and second apertures each having an adjustable size allowing the excitation light beam to pass through the aperture device as separate beams of coherent light, while a remaining portion of the excitation light beam is blocked by the aperture device;
   a focal lens focusing the separate beams of coherent light to overlap at a focal plane of the focal lens creating a light intensity fringe pattern at an interrogation zone;
   a flow chamber for streaming particles through the interrogation zone;
   a light collection unit receiving scattered and emitted light from the particles passing through the light intensity fringe pattern at the interrogation zone; and
   a computing system configured to analyze the scattered and emitted light from the particles passing through the light intensity fringe pattern to determine one or more characteristics of the particles.

2. The detection system of claim 1, wherein the computing system includes:
   at least one processing device; and
   a memory device storing instructions which, when executed by the at least one processing device, cause the at least one processing device to:
      receive a selection of a particle type; and
      adjust at least one of the adjustable size of the first and second apertures and the distance between the first and second apertures to create an optimal light intensity fringe pattern for analyzing the particle type.

3. The detection system of claim 2, wherein the adjustable size of the first and second apertures includes a width and a height, and wherein the instructions, when executed by the at least one processing device, further cause the at least one processing device to:
   adjust at least one of the width and the height of the first and second apertures to create the optimal light intensity fringe pattern for analyzing the particle type.

4. The detection system of claim 2, wherein the adjustable size of the first and second apertures includes a width and a height, and wherein the instructions, when executed by the at least one processing device, further cause the at least one processing device to:
   adjust both the width and the height of the first and second apertures to create the optimal light intensity fringe pattern for analyzing the particle type.

5. The detection system of claim 2, wherein the instructions, when executed by the at least one processing device, further cause the at least one processing device to:
   retrieve at least one of a predefined size of the first and second apertures and a predefined distance between the first and second apertures from a lookup table, the predefined size and the predefined distance associated with the optimal light intensity fringe pattern for analyzing the particle type.

6. The detection system of claim 1, wherein the excitation light beam passes through the first and second apertures of the aperture device before reaching the interrogation zone.

7. The detection system of claim 1, wherein the aperture device is positioned in the optical path of the excitation light beam before the focal lens.

8. The detection system of claim 1, wherein the excitation light beam is a collimated beam that passes through the first and second apertures of the aperture device, and the focal lens converges the collimated beam at the interrogation zone.

9. The detection system of claim 1, wherein the one or more characteristics of the particles include a morphology of the particles.

10. The detection system of claim 1, wherein the computing system detects particles having a size of 40 nm or larger passing through the light intensity fringe pattern.

11. A method of analyzing particles in a flow cytometer, the method comprising:
   receiving a selection of a particle type;
   adjusting at least one of a size of first and second apertures and a distance between the first and second apertures based on the particle type;
   generating a light intensity fringe pattern at an interrogation zone of the flow cytometer by directing an excitation light beam through the first and second apertures, and using a focal lens to converge separate beams of coherent light that emerge from the first and second apertures to overlap creating the light intensity fringe pattern at the interrogation zone; and
   collecting scattered or emitted light from particles of the selected particle type passing through the light intensity fringe pattern.

12. The method of claim 11, wherein both the size of the first and second apertures and the distance between the first and second apertures are adjusted based on the particle type.

13. The method of claim 11, wherein the size of the first and second apertures includes a width and a height, and adjusting the size of the first and second apertures includes adjusting at least one of the width and the height of the first and second apertures.

14. The method of claim 11, wherein the size of the first and second apertures includes a width and a height, and adjusting the size of the first and second apertures includes adjusting both the width and the height of the first and second apertures.

15. The method of claim 11, further comprising:

retrieving at least one of a predefined size of the first and second apertures and a predefined distance between the first and second apertures from a lookup table, the predefined size and the predefined distance being associated with an optimal light intensity fringe pattern for detecting or analyzing the particles of the selected particle type.

16. The method of claim 11, further comprising:

emitting the excitation light beam as a collimated beam;

transmitting the collimated beam through the first and second apertures and blocking a remaining portion of the collimated beam using an aperture device of the first and second apertures.

\* \* \* \* \*